Patented Dec. 3, 1940

2,223,631

UNITED STATES PATENT OFFICE 2,223,631

SODIUM CARBONATE-SULPHUR COMPOSITION

Robert B. MacMullin, Niagara Falls, N. Y., assignor to The Mathieson Alkali Works, Inc., New York, N. Y., a corporation of Virginia No Drawing. Application November 29, 1938, Serial No. 242,956

3 Claims. (Cl. 23—5)

This invention provides, in the form of a fusion product, a synthetic "salt cake" which affords several important advantages.

In the manufacture of kraft pulp by the so-called "sulphate process," wood chips are pulped by cooking in a liquor containing as its essential constituent not sodium sulphate but sodium sulphide. The "black liquor" resulting from the cooking is concentrated and the "sulphate" then enters the process in the form of an addition of "salt cake" after which this composite is subjected to a furnacing operation in which the carbonaceous content of the "black liquor" is made effective to reduce sulphates to sulphides, the liquor thus being regenerated for re-use.

The conventional "salt cake" is produced by treating common salt, sodium chloride, with sulphuric acid, hydrochloric acid being liberated and sodium sulphate remaining as a residue. Instead of using sodium sulphate in the "sulphate process," it is possible to use sulphur and sodium salts other than the sulphate for the regeneration of the cooking liquor. Hitherto, however, such substitution has involved the pulp manufacturer in increasing complexities, difficulties of control, the handling of dusty chemicals, and related difficulties.

I have discovered that sodium carbonate and sulphur can be agglomerated, by fusion of the sulphur, to form a synthetic "salt cake" which duplicates, for the kraft pulp manufacturer, the conventional "salt cake." This new fusion product can be used precisely as the conventional "salt cake" is used and, properly proportioned, can be used pound for pound as though it were conventional "salt cake."

The synthetic "salt cake" of my invention consists essentially of sodium carbonate and sulphur, in proportions by weight of 106 and 32 respectively if conventional "salt cake" is to be duplicated, agglomerated, by fusion of the sulphur, under conditions producing a granular, dustless and free flowing product in which the sodium carbonate and sulphur are chemically uncombined. In general, I accomplish this by using sodium carbonate, soda ash, of reasonably uniform particle size, by using a minimum sulphur:sodium carbonate weight ratio of 20:100, and by agitation while the fusion product is congealing.

The proportions in which the sulphur and sodium carbonate are combined can be varied to meet the requirements of the sulphate process or other operation in which the product is used. A product compounded of about 32 parts by weight of sulphur to 106 parts by weight of sodium carbonate (that is about 3 parts to 10 parts) will react in the regeneration of "black liquor" as though it were conventional "salt cake" without leaving any substantial excess of either sulphur or sodium oxide equivalent. The proportions, however, may be varied to suit the needs of particular pulping operations or of other operations in which the synthetic "salt cake" is employed.

In order to obtain a product of optimum physical characteristics with respect to handling and storage, the proportion of sulphur employed should be at least 20% of the weight of the sodium carbonate. If the ratio of sulphur to sodium carbonate is less than this, the association of the two components tends to be incomplete or non-uniform. With appropriate agitation during cooling, the product is free flowing, granular and not dusty, of substantially uniform composition, and will not segregate or pack during shipment or storage.

The fusion operation should be conducted in a non-oxidizing atmosphere to prevent loss of sulphur.

The particle size of the sodium carbonate is not particularly critical. The ordinary granular commercial soda ash may be employed, care being taken to break up any large lumps that may have formed during storage. The particle size of the fusion product will usually average somewhat above that of the sodium carbonate used, but approaches the latter with increasing agitation during cooling.

The following are preferred methods for producing the synthetic "salt cake" of my invention.

I

At room temperature, 106 parts by weight of light soda ash are mixed with 32 parts by weight of powdered sulphur. This mixture is then heated to a temperature above the melting point of sulphur (120° C.). This is done in a non-oxidizing atmosphere to minimize or prevent formation of sulphur dioxide and thiosulphates. Agitation is continued while the product is allowed to cool until it solidifies. It is preferable to continue cooling in a non-oxidizing atmosphere to a point (say 60° C.) at which there is no danger of spontaneous ignition of any component of the product.

II

Hot soda ash issuing from a rotary drier or calciner at a temperature of about 180° C. to about 200° C. is added to solid sulphur at room temperature, the proportions of soda ash to sulphur being about 10 parts to 3 parts by weight. The heat of the soda ash being sufficient to melt the sulphur, the mixture is agitated until the sulphur has fused and combined with the particles of soda ash. Agitation is continued thereafter while the product is cooled as in Example I. During the entire operation the product is maintained out of contact with air or other oxidizing gases.

III

This operation is similar to that of Examples I and II, except that the sulphur is melted and run into soda ash which has an initial temperature in excess of 120° C., mixing of the two ingredients being continued while the molten sulphur agglomerates with the soda ash particles and during the subsequent cooling.

IV 32 parts by weight of powdered sulphur are run into 168 parts by weight of sodium bicarbonate while maintaining a temperature of about or somewhat above 150° C. After evolution of carbon dioxide is substantially complete, the product is permitted to solidify by cooling while maintaining agitation. The operation is conducted in a non-oxidizing atmosphere.

The process as exemplified above may be carried out batch-wise or continuously.

The resulting fusion product, as indicated hereinbefore, is particularly effective in reaction with the carbonaceous material in the aqueous "black liquor" of the "sulphate process" and my invention contemplates the use of this fusion product in the regeneration of such "black liquor." Thus the synthetic "salt cake" of my invention is added to the "black liquor" concentrated as in customary practice, containing carbonaceous material, and the resulting mixture is heated until the synthetic "salt cake" reacts with this carbonaceous material to form sodium sulphide. The reactions involved in this regeneration may be typified as follows:

$$Na_2CO_3 + S + 2C \rightarrow Na_2S + 3CO$$

The reaction of the conventional regeneration may be typified as follows:

$$Na_2SO_4 + 4C \rightarrow Na_2S + 4CO$$

Since the molecular weight of $Na_2CO_3 + S(138)$ approximates, or is slightly less than, that of $Na_2SO_4(142)$, the same, or a slightly smaller, weight of the synthetic "salt cake" of my invention will do the work of conventional "salt cake" just as though it were conventional "salt cake." The pulp manufacturer can use the new fusion product in place of conventional "salt cake" without change in operation, without change in equipment for storing and handling the reagent, and even without change in instructions to the operators.

I claim:

1. A granular fusion product consisting essentially of agglomerated sodium carbonate and sulphur with substantially all of the sodium carbonate and sulphur being chemically uncombined.

2. A granular fusion product consisting essentially of agglomerated sodium carbonate and sulphur with substantially all of the sodium carbonate and sulphur being chemically uncombined, the proportion of sulphur equalling at least 20% of the weight of the sodium carbonate.

3. A granular fusion product consisting essentially of agglomerated sodium carbonate and sulphur with substantially all of the sodium carbonate and sulphur being chemically uncombined in weight proportions approximating 10 and 3 respectively.

ROBERT B. MacMULLIN.